(12) United States Patent
Piskun et al.

(10) Patent No.: US 12,437,046 B2
(45) Date of Patent: Oct. 7, 2025

(54) METHOD, APPARATUS, AND RECORDING MEDIUM FOR PERFORMING AUTHENTICATION

(71) Applicant: Samsung Electronics Co., Ltd., Suwon-si (KR)

(72) Inventors: Oleksii Piskun, Kyiv (UA); Vitalii Petrychenko, Kyiv (UA); Mykola Alieksieiev, Kyiv (UA); Oleg Kopysov, Kyiv (UA); Stanislav Pedan, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 18/063,264

(22) Filed: Dec. 8, 2022

(65) Prior Publication Data
US 2023/0100037 A1 Mar. 30, 2023

Related U.S. Application Data

(63) Continuation of application No. PCT/KR2020/008507, filed on Jun. 30, 2020.

(30) Foreign Application Priority Data
Jun. 9, 2020 (KR) .................. 10-2020-0069852

(51) Int. Cl.
 *G06F 21/32* (2013.01)
 *G06F 21/45* (2013.01)
 *G06F 21/60* (2013.01)

(52) U.S. Cl.
 CPC .............. *G06F 21/32* (2013.01); *G06F 21/45* (2013.01); *G06F 21/602* (2013.01)

(58) Field of Classification Search
 CPC ........ G06F 21/32; G06F 21/602; G06F 21/31; G06F 21/62; G06F 21/30; G06F 21/45
 (Continued)

(56) References Cited

U.S. PATENT DOCUMENTS 8,879,728 B2 * 11/2014 MacMillan ........... H04L 9/0861
  713/165
9,031,231 B2   5/2015 Asim et al.
(Continued)

FOREIGN PATENT DOCUMENTS

EP      3 374 913 A1   9/2018
JP      2019-161405 A  9/2019
(Continued)

OTHER PUBLICATIONS

Chang D, Garg S, Hasan M, Mishra S. Cancelable multi-biometric approach using fuzzy extractor and novel bit-wise encryption. IEEE Transactions on Information Forensics and Security. Mar. 25, 2020;15:3152-67. (Year: 2020).*
(Continued)

*Primary Examiner* — Syed A Zaidi
(74) *Attorney, Agent, or Firm* — Jefferson IP Law, LLP

(57) ABSTRACT

A method of performing authentication by an electronic apparatus and an electronic apparatus for performing authentication are provided. The electronic apparatus receives an access request to an application executed on the electronic apparatus, obtain any one of public helper data and private helper data, which are used for user authentication, based on the access requested application, obtain an encryption key from user's biometric information received according to the access request, based on the public helper data or the private helper data by using a fuzzy extractor, and perform user authentication for accessing the application, based on the obtained encryption key.

15 Claims, 11 Drawing Sheets

(58) Field of Classification Search
USPC ........................................ 726/18, 2; 713/186
See application file for complete search history.

(56) References Cited

U.S. PATENT DOCUMENTS

| | | | |
|---|---|---|---|
| 9,384,338 B2 | 7/2016 | Kevenaar et al. | |
| 9,614,843 B2 | 4/2017 | Jia et al. | |
| 9,800,562 B2 | 10/2017 | Lalwani et al. | |
| 10,778,423 B2 | 9/2020 | Cho et al. | |
| 11,223,478 B2 | 1/2022 | Eldefrawy et al. | |
| 11,777,736 B2* | 10/2023 | Blackhurst | H04L 9/0866 713/186 |
| 2014/0325230 A1* | 10/2014 | Sy | H04L 9/3231 713/171 |
| 2015/0095654 A1* | 4/2015 | Li | H04L 9/0866 713/186 |
| 2016/0100314 A1* | 4/2016 | Chung | H04L 63/0861 713/186 |
| 2017/0149572 A1* | 5/2017 | Wallrabenstein | H03K 19/17748 |
| 2017/0185761 A1* | 6/2017 | Stanwood | G06V 40/1365 |
| 2019/0020472 A1 | 1/2019 | Cho et al. | |
| 2019/0312731 A1* | 10/2019 | Eldefrawy | H04L 9/085 |
| 2020/0145206 A1 | 5/2020 | Cho et al. | |
| 2020/0296093 A1* | 9/2020 | Hoyos | H04L 9/3247 |

FOREIGN PATENT DOCUMENTS

| | | |
|---|---|---|
| KR | 10-1792220 B1 | 11/2017 |
| KR | 10-2019-0070472 A | 6/2019 |
| KR | 10-2035249 B1 | 10/2019 |
| KR | 10-2019-0129417 A | 11/2019 |
| WO | 2015/047385 A1 | 4/2015 |

OTHER PUBLICATIONS

NPL Search Terms (Year: 2025).*
Yining Liu et al., A secure data backup scheme using multifactor authentication, IET Information Security, ISSN 1751-8709, Nov. 2016.
International Search Report dated Feb. 26, 2021, issued in International Application No. PCT/KR2020/008507.
Korean Office Action dated Sep. 1, 2024, issued in Korean Patent Application No. 10-2020-0069852.

* cited by examiner

METHOD, APPARATUS, AND RECORDING MEDIUM FOR PERFORMING AUTHENTICATION

CROSS-REFERENCE TO RELATED APPLICATION(S)

This application is a continuation application, claiming priority under § 365(c), of an International application No. PCT/KR2020/008507, filed on Jun. 30, 2020, which is based on and claims the benefit of a Korean patent application number 10-2020-0069852, filed on Jun. 9, 2020, in the Korean Intellectual Property Office, the disclosure of which is incorporated by reference herein in its entirety.

BACKGROUND

1. Field

The disclosure relates to a method of performing authentication, an apparatus for performing authentication, and a computer-readable recording medium having recorded thereon a program for executing, on a computer, the method of performing authentication.

2. Description of Related Art

Generally, user identification is performed as a user manipulates a screen tab or a button to select user identity information. Furthermore, to prevent others from using user identity information, an input of a password may be required. As such, general user identification forces a burden on a user, for example, the manipulation of a screen tab or a button, moreover a password input, and the like, and thus convenience is degraded. Accordingly, to reduce the user's burden during user identification, devices having a biometric authentication function have been developed.

The biometric authentication function is a technology to authenticate a user by using biometric information. For example, an electronic apparatus may generate an intrinsic identifier indicating a user based on biometric information input by the user, and authenticate the user based thereon. For the user authentication using biometric information, when biometric information stored in an electronic apparatus leaks by third person's attack, for example, hacking and the like, there is a problem that security is vulnerable. Accordingly, in consideration of user's convenience and security, there is a need to develop technology to use biometric information in user authentication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an encryption key based on biometric information, in consideration of an authentication level needed to access an application.

Additional aspects will be set forth in part in the description which follows and, in part, will be apparent from the description, or may be learned by practice of the presented embodiments.

In accordance with an aspect of the disclosure, a method of performing authentication by an electronic apparatus and an electronic apparatus for performing authentication are provided. The electronic apparatus receives an access request to an application executed on the electronic apparatus, obtain any one of public helper data and private helper data, which are used for user authentication, based on the access requested application, obtain an encryption key from user's biometric information received according to the access request, based on the public helper data or the private helper data by using a fuzzy extractor, and perform user authentication for accessing the application, based on the obtained encryption key.

A method of performing authentication by an electronic apparatus, according to an embodiment, includes receiving an access request to an application executed on the electronic apparatus, obtaining any one of public helper data and private helper data, which are used for user authentication, based on the access requested application, obtaining an encryption key from user's biometric information received according to the access request, based on the public helper data or the private helper data by using a fuzzy extractor, and performing user authentication for accessing the application, based on the obtained encryption key.

The method of performing authentication by an electronic apparatus, according to an embodiment, further includes requesting user information registration, and generating an encryption key corresponding to the biometric information, public helper data, and private helper data, by using the fuzzy extractor, from the biometric information obtained according to the user information registration request, wherein the public helper data is transmitted to a server, the private helper data is stored in the electronic apparatus, and the encryption key corresponding to the biometric information is deleted.

In the method of performing authentication by an electronic apparatus, according to an embodiment, the obtaining of the private helper data includes identifying an authentication level required in the access requested application, and when the identified authentication level is less than a preset value, obtaining private helper data corresponding to the identified authentication level from at least one piece of the private helper data stored in the electronic apparatus.

In the method of performing authentication by an electronic apparatus, according to an embodiment, the obtaining of the encryption key includes identifying whether a degree of matching between a hash value corresponding to the biometric information and a hash value corresponding to the obtained private helper data is greater than or equal to a first threshold value, and obtaining the encryption key by using the biometric information, the obtained private helper data, and a Rep function, based on whether the degree of matching is greater than or equal to the first threshold value.

In the method of performing authentication by an electronic apparatus, according to an embodiment, the obtaining of the private helper data includes identifying an authentication level required in the access requested application, and when the identified authentication level is greater than or equal to the preset value, requesting public helper data from a server, and receiving the public helper data from the server, based on the request.

In the method of performing authentication by an electronic apparatus, according to an embodiment, the obtaining of the encryption key includes identifying whether a degree of matching between a hash value corresponding to the biometric information and a hash value corresponding to the obtained public helper data is greater than or equal to a second threshold value, and obtaining the encryption key by using the biometric information, the obtained public helper data, and a Rep function, based on whether the degree of matching is greater than or equal to the second threshold value.

In the method of performing authentication by an electronic apparatus, according to an embodiment, the second threshold value may have a value greater than the first threshold value used to identify a degree of matching between biometric information and private helper data.

The method of performing authentication by an electronic apparatus, according to an embodiment, further include receiving a recovery request of the private helper data, receiving second biometric information, identifying whether a degree of matching between a hash value corresponding to the second biometric information and a hash value corresponding to the public helper data is greater than or equal to a third threshold value, based on the public helper data received from a server, and generating the encryption key and the private helper data by using the second biometric information, the public helper data, and a Rep function, based on whether the degree of matching is greater than or equal to the third threshold value.

In the method of performing authentication by an electronic apparatus, according to an embodiment, authentication is performed based on the encryption key, wherein the encryption key includes a string randomly generated based on a polynomial generated by a gen function.

An electronic apparatus for performing authentication, according to an embodiment, includes a communication unit, a memory storing one or more instructions, and at least one processor configured to execute the one or more instructions stored in the memory, wherein the at least one processor is further configured to receive an access request to an application executed on the electronic apparatus, obtain any one of public helper data and private helper data, which are used for user authentication, based on the access requested application, obtain an encryption key from user's biometric information received according to the access request, based on the public helper data or the private helper data by using a fuzzy extractor, and perform user authentication for accessing the application, based on the obtained encryption key.

A computer-readable recording medium having stored therein one or more instructions, according to an embodiment, causes an electronic apparatus to receive an access request to an application executed on the electronic apparatus, obtain any one of public helper data and private helper data, which are used for user authentication, based on the access requested application, obtain an encryption key from user's biometric information received according to the access request, by using a fuzzy extractor, based on the public helper data or the private helper data, and perform user authentication for accessing the application, based on the obtained encryption key.

The disclosed embodiment may efficiently manage an access to information that requires security, by generating an encryption key based on biometric information by using public helper data or private helper data, in consideration of an authentication level needed to access an application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the entire specification, when a portion is referred to as being "connected" to another portion, it can be "directly connected" to the other portion or "electrically connected" to the other portion via an intervening portion. Furthermore, it will be further understood that, when a portion "comprises" a constituent element, specify the presence of stated features or components, but do not preclude the presence or addition of one or more other features or components.

In the disclosure, biometric information refers to information about a signal generated from the body of a user. For example, the biometric information may include user's pulse waves, heart rates, fingerprints, glottis, blood pressure, nictation, electroencephalogram, electrocardiogram, heart sound, electrooculogram, electromyogram, body temperature, and the like. However, this is just an embodiment, and the biometric information of the disclosure is not limited to the above example.

An application refers to software developed so that users can perform a specific task using an electronic apparatus. For example, the application may include a mail application, a messenger application, a schedule management application, a document editing application, and the like. Furthermore, the application may consist of instructions needed to perform a specific task. For applications that require security, authentication may be required for access, authentication may be required for each task that can be performed through the application.

Figure 1:
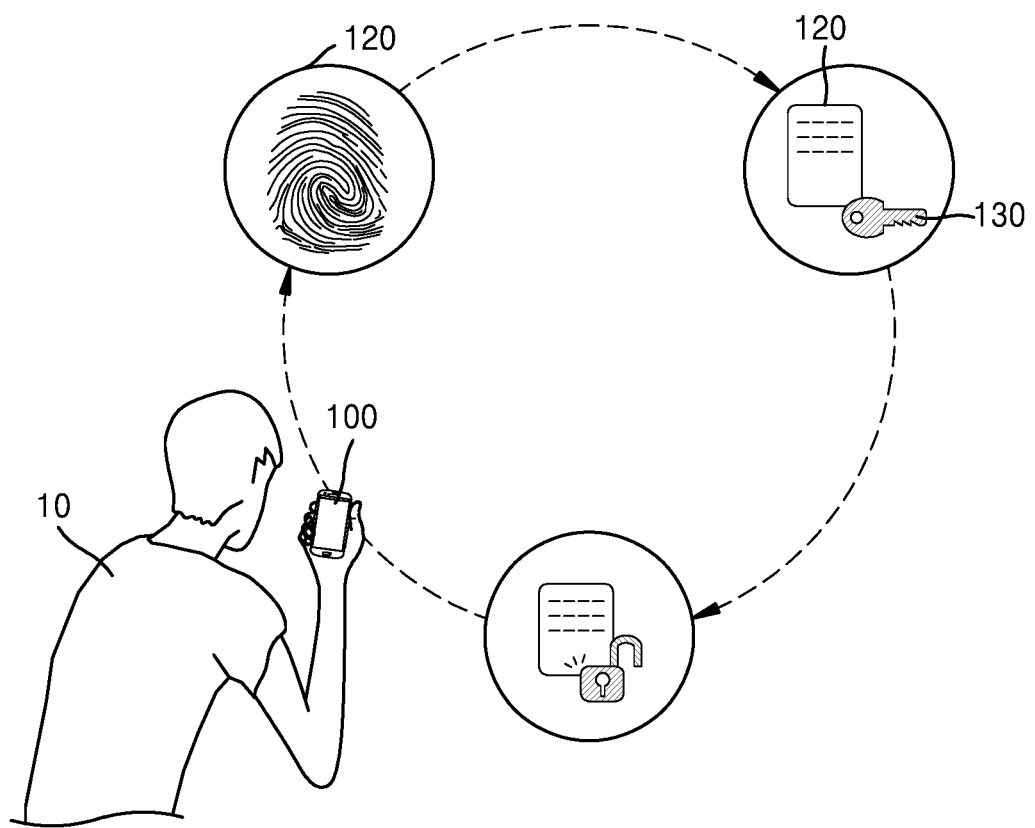
FIG. 1 is a conceptual view for explaining an authentication method according to an embodiment of the disclosure.

FIG. 1 is a conceptual view for explaining an authentication method according to an embodiment of the disclosure.

Referring to FIG. 1, a user 10 may try to access at least one application installed in an electronic apparatus 100. The application accessed by the user 10 may require authentication for security. Accordingly, the user 10 may input biometric information 120 to the electronic apparatus.

Meanwhile, when a user's trial to access is a first attempt, information about the biometric information 120 of a user 10 needs to be stored in the electronic apparatus 100. However, in a conventional authentication method, as the biometric information 120 of a user 10, or an encryption key 130 generated based thereon and the like, is stored directly in the electronic apparatus 100, when a third person hacks the information of the electronic apparatus 100, there is a problem of easy leakage of information needed for authentication. Accordingly, in the authentication method according to the disclosure, an encryption key needed for authentication is generated whenever a user's biometric information 120 needed for authentication is received to execute an application or perform a specific task of the application, and when the authentication is completed, the encryption key is deleted without being stored, and thus, the occurrence of the authentication information leakage problem may be prevented.

For example, in an authentication method according to an embodiment, an encryption key may be generated from biometric information by using a fuzzy extractor. Helper data, which is necessary to generate an encryption key from biometric information by using a fuzzy extractor, may be generated based on biometric information in a registration stage of initially obtaining user's biometric information. While disposing of the encryption key, the electronic apparatus may store the generated helper data. In this case, an electronic apparatus according to an embodiment may use private helper data to obtain an encryption key for applications having an authentication level less than a preset value, and the private helper data may be stored in the electronic apparatus 100. According to another embodiment, for applications having an authentication level greater than or equal to the preset value, the electronic apparatus may use public helper data to obtain an encryption key, and the public helper data, which is used for accessing applications having a relatively high authentication level, may be stored in a separate server. Accordingly, the electronic apparatus may transmit the public helper data to a server, and the server may store the public helper data received from the electronic apparatus.

The electronic apparatus described in the disclosure may include smart phones, smart television (TVs), desktop computers, wearable devices, tablet personal computers (PCs), laptop computers, digital broadcasting terminals, personal digital assistants (PDAs), portable multimedia player (PMPs), navigation devices, and the like.

Figure 2:
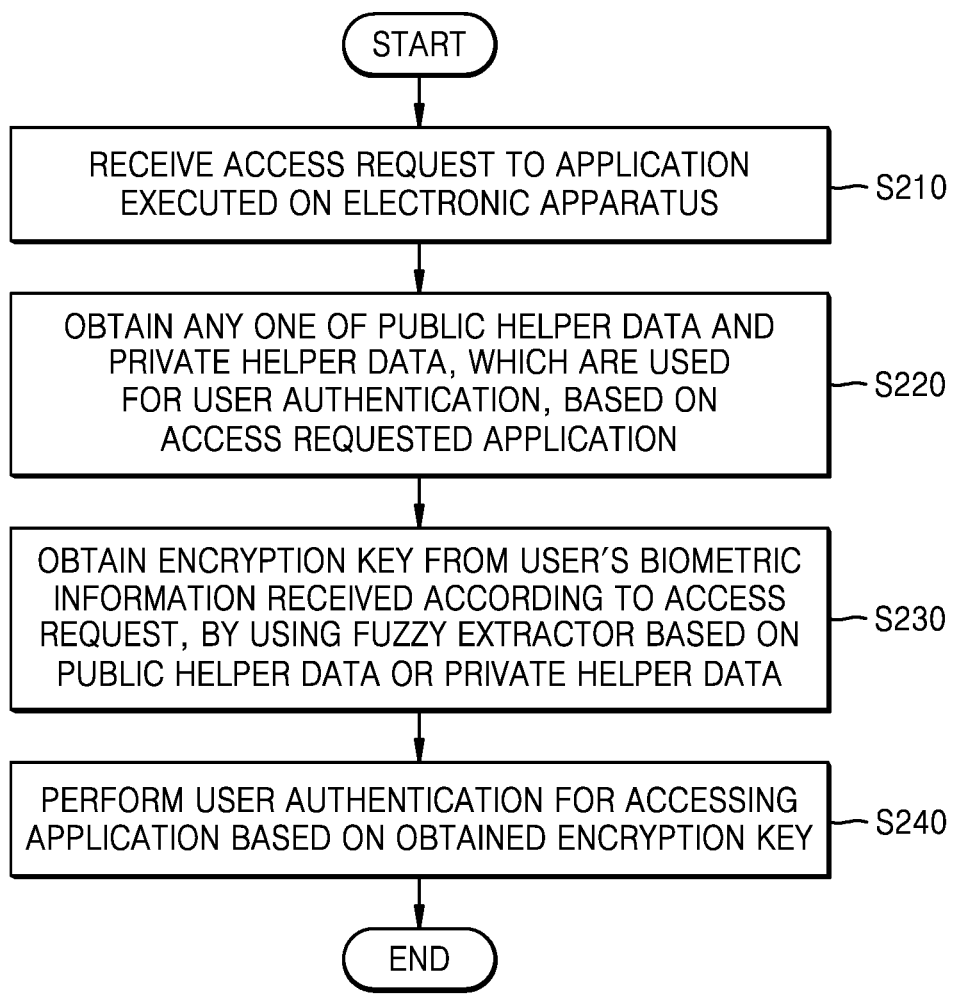
FIG. 2 is a flowchart for explaining an authentication method by an electronic apparatus, according to an embodiment of the disclosure.

FIG. 2 is a flowchart for explaining an authentication method by an electronic apparatus, according to an embodiment of the disclosure.

In operation S210, the electronic apparatus may receive an access request to an application executed on the electronic apparatus. In the embodiment, it is assumed that public helper data and private helper data are previously generated based on biometric information of a user. Furthermore, the private helper data may be stored in the electronic apparatus, and the public helper data may be stored in a server outside the electronic apparatus.

For example, a user may request an access to a specific application by selecting an icon of the specific application in an application list displayed on a screen of the electronic apparatus. However, this is an example, and the application access requesting method by a user is not limited thereto.

According to another embodiment, the application access request may include information that specifies one of various tasks to be executed through the application. For example, when a user accesses a document processing related application, a task for viewing a document does not require authentication, but a task for editing a document may require authentication. Accordingly, the electronic apparatus may determine whether a specific task requires authentication based on information included in the access request.

In operation S220, the electronic apparatus may obtain any one of public helper data and private helper data, which are used for user authentication, based on the access requested application.

The electronic apparatus according to an embodiment may obtain public helper data or private helper data based on the authentication level of the access requested application. The authentication level may vary depending on a degree of security required by an application, and when the authentication level is less than a preset value, private helper data may be used for generating an encryption key, and when the authentication level is greater than or equal to the preset value, public helper data may be used for generating an encryption key. As described above in FIG. 1, the private helper data may be stored in the electronic apparatus, and the public helper data may be stored in the server outside the electronic apparatus.

When the authentication level is less than a preset value, the electronic apparatus may obtain the private helper data stored in the electronic apparatus. Furthermore, the electronic apparatus may receive the public helper data from the server when the authentication level is greater than or equal to the preset value.

Meanwhile, whether to use public helper data or private helper data in generation of an encryption key for application access is not determined based on only the authentication level of an application described above. This may be determined according to the type of a task to be executed in an application.

In operation S230, the electronic apparatus may obtain an encryption key from user's biometric information received according to the access request, by using a fuzzy extractor, based on public helper data or private helper data.

An electronic apparatus according to an embodiment may generate may generate an encryption key by using a fuzzy extractor, based on the public helper data received from the server and the biometric information. An electronic apparatus according to another embodiment may generate an encryption key by using a fuzzy extractor, based on the private helper data received from the server and the biometric information.

In operation S240, the electronic apparatus may perform user authentication for application access based on the obtained encryption key. As the encryption key is generated, the electronic apparatus may perform user authentication based thereon.

Figure 3:
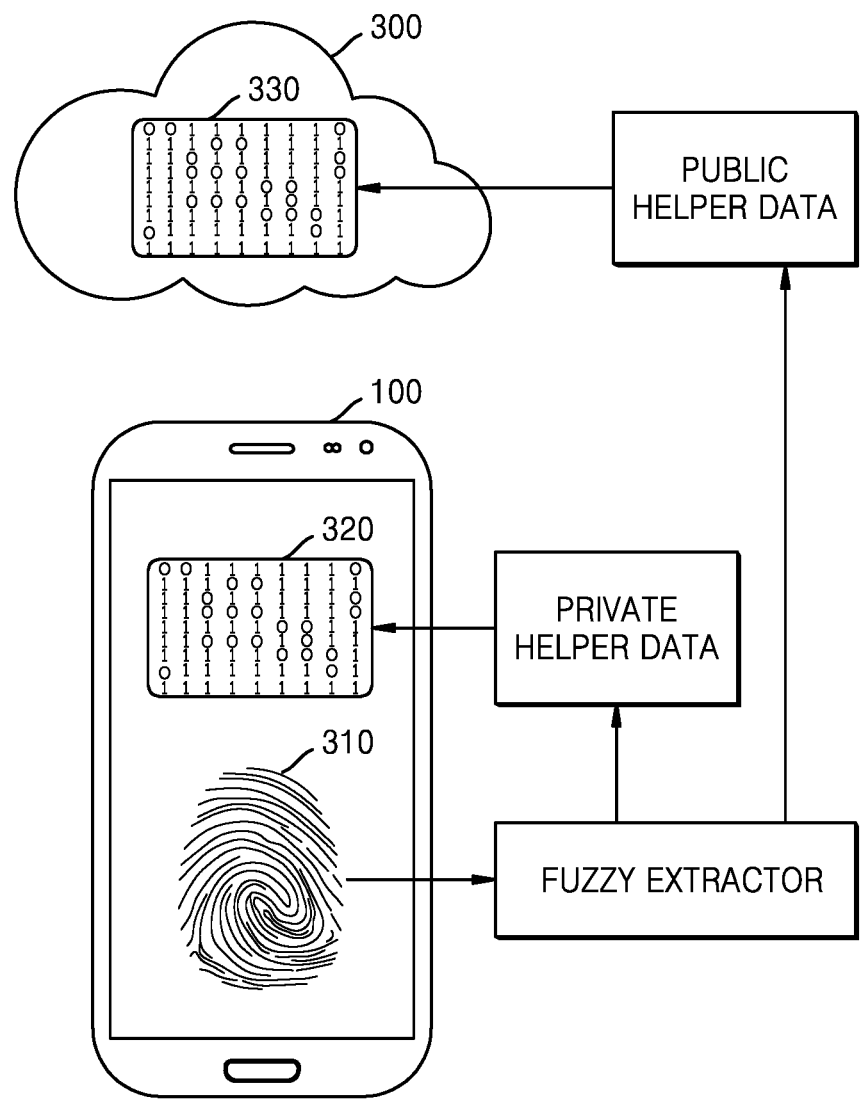
FIG. 3 is a view for explaining a method of generating private helper data and public helper data, according to an embodiment of the disclosure.

FIG. 3 is a view for explaining a method of generating private helper data and public helper data, according to an embodiment of the disclosure.

Referring to FIG. 3, in order to request registration of user authentication information, the electronic apparatus 100 may display a user interface to guide an input of user's biometric information input on a screen of the electronic apparatus 100. For example, the electronic apparatus 100 may provide a guideline for obtaining a user fingerprint, or drive a camera to photograph user's iris and the like. In the embodiment, it is assumed that a fingerprint is used as the user's biometric information.

The electronic apparatus 100 may generate private helper data 320 and public helper data 330 by using a fuzzy extractor, based on the obtained biometric information 310. The fuzzy extractor, which is a technology to generate an encryption key from biometric information, may generate an encryption key based on the registered biometric information, only if the obtained user's biometric information is similar to the registered biometric information to a certain degree, even when the obtained user's biometric information is changed every time. In this state, data consisting of strings that help generating an encryption key from biometric information is helper data. The generated encryption key may be disposed of after used for authentication, and to access again the application later, new biometric information is received and then an encryption key is generated based on the received new biometric information.

Meanwhile, usability of the authentication method may be determined according to a similarity between the registered biometric information required to generate an encryption key and biometric information input to access an application. For example, when a required similarity is high, security may be reinforced, but it would be inconvenient for a user to input biometric information many times to input biometric information having a high similarity with the registered biometric information. In contrast, when a required similarity is low, a user may easily access an application, but it would be a problem that security is vulnerable.

The authentication method according to an embodiment may address the above problems by distinguishing a similarity between the required registered biometric information and the biometric information input for application access, according to security necessity for an application. For example, for an application in which user's accessibility is regarded to be more important than security, the private helper data 320 requiring a relatively low similarity is used, and for an application in which security is regarded to be more important than user's accessibility, the public helper data 330 requiring a relatively high similarity may be used.

Figure 4:
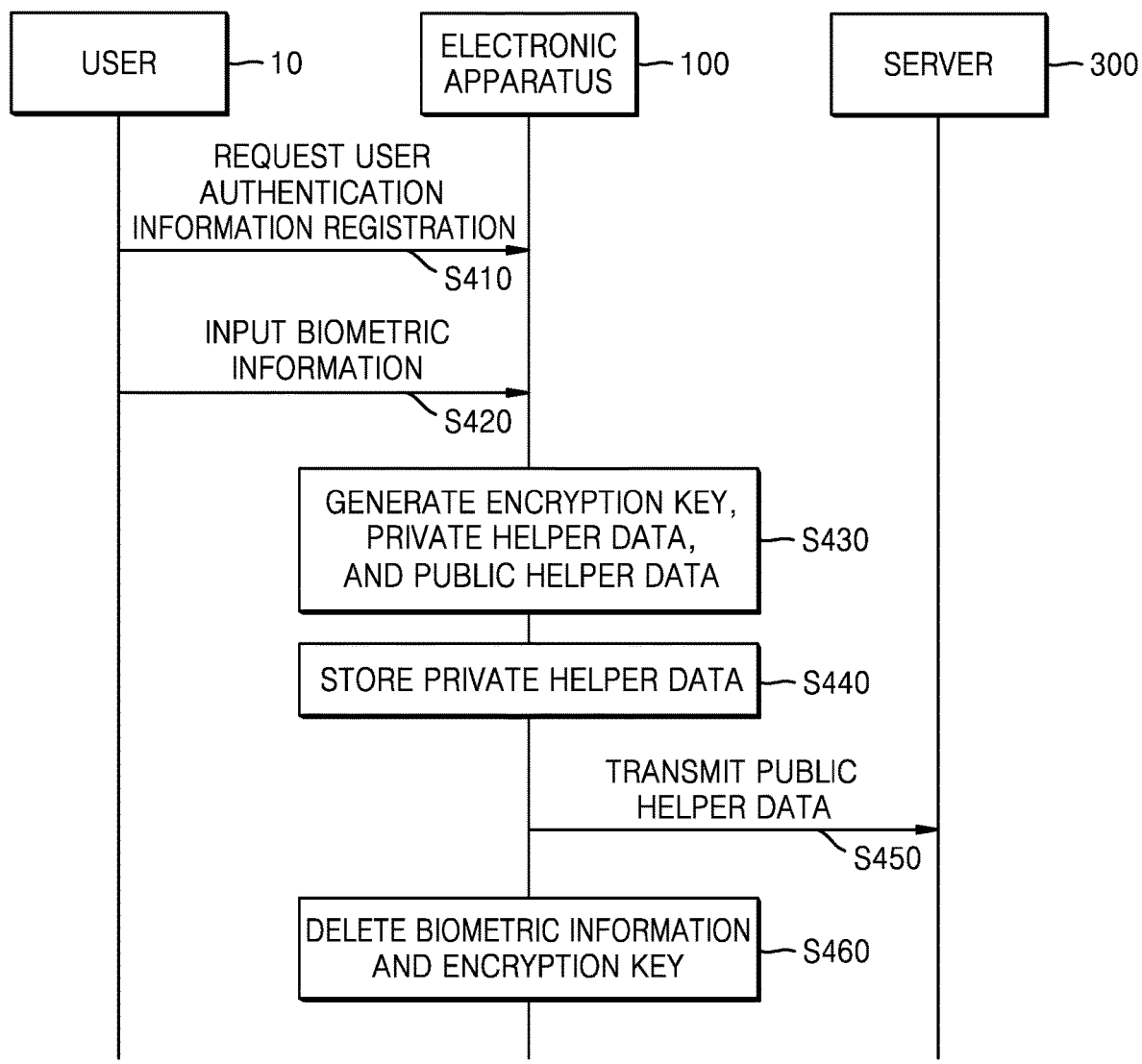
FIG. 4 is a flowchart for explaining a method of generating private helper data and public helper data, according to an embodiment of the disclosure.

FIG. 4 is a flowchart for explaining a method of generating private helper data and public helper data, according to an embodiment of the disclosure.

In operation S410, the user 10 may request the electronic apparatus 100 for registration of user authentication information. However, this is just an embodiment, and according to another embodiment, the electronic apparatus 100 may request the user 10 for registration of user authentication information.

In operation S420, the electronic apparatus 100 may receive biometric information from a user. For example, the user may input fingerprint information by tapping the screen of the electronic apparatus 100 by using a user's finger, or according to another embodiment, the user may input user's iris information by driving the camera of the electronic apparatus 100.

In operation S430, the electronic apparatus 100 may generate an encryption key, private helper data, and public helper data, based on the user's biometric information.

As described above with reference to FIG. 3, the private helper data and the public helper data may be discriminated according to the similarity between the registered biometric information required to generate an encryption key and the biometric information input for application access.

Furthermore, although, in the disclosure, it is assumed that helper data is generated in two types, the electronic apparatus may generate two or more pieces of helper data by using a fuzzy extractor, according to the authentication levels of applications to be managed by the electronic apparatus 100. In this state, each of the generated two or more pieces of helper data may be discriminated according to the similarity between the registered biometric information required for generation of an encryption key and the biometric information input for application access.

In operation S440, the electronic apparatus 100 may store the private helper data in the electronic apparatus 100. The electronic apparatus 100 may store the private helper data in one or more electronic apparatus. According to an embodiment, the one or more electronic apparatuses that store the private helper data may be electronic apparatuses that are synchronized with each other. For example, when a user uses a smart phone and a wearable device together, the private helper data may be stored in each of the smart phone and the wearable device. Furthermore, according to another embodiment, the private helper data may be stored in a user's cloud server connected to each of the smart phone and the wearable device.

In operation S450, the electronic apparatus 100 may transmit the public helper data to a server 300. According to an embodiment, the electronic apparatus 100 may transmit the public helper data to the server 300 existing outside the electronic apparatus 100 to be stored therein. The electronic apparatus 100 may prevent the public helper data from leaking due to hacking of the electronic apparatus 100, by storing the public helper data in the server 300, the public helper data being used to generate an encryption key for accessing an application requiring relatively strict security.

In operation S460, the electronic apparatus 100 may delete the biometric information and the encryption key. The electronic apparatus 100 according to an embodiment may delete the biometric information and the encryption key as the obtaining of the private helper data and the public helper data is completed.

Figure 5:
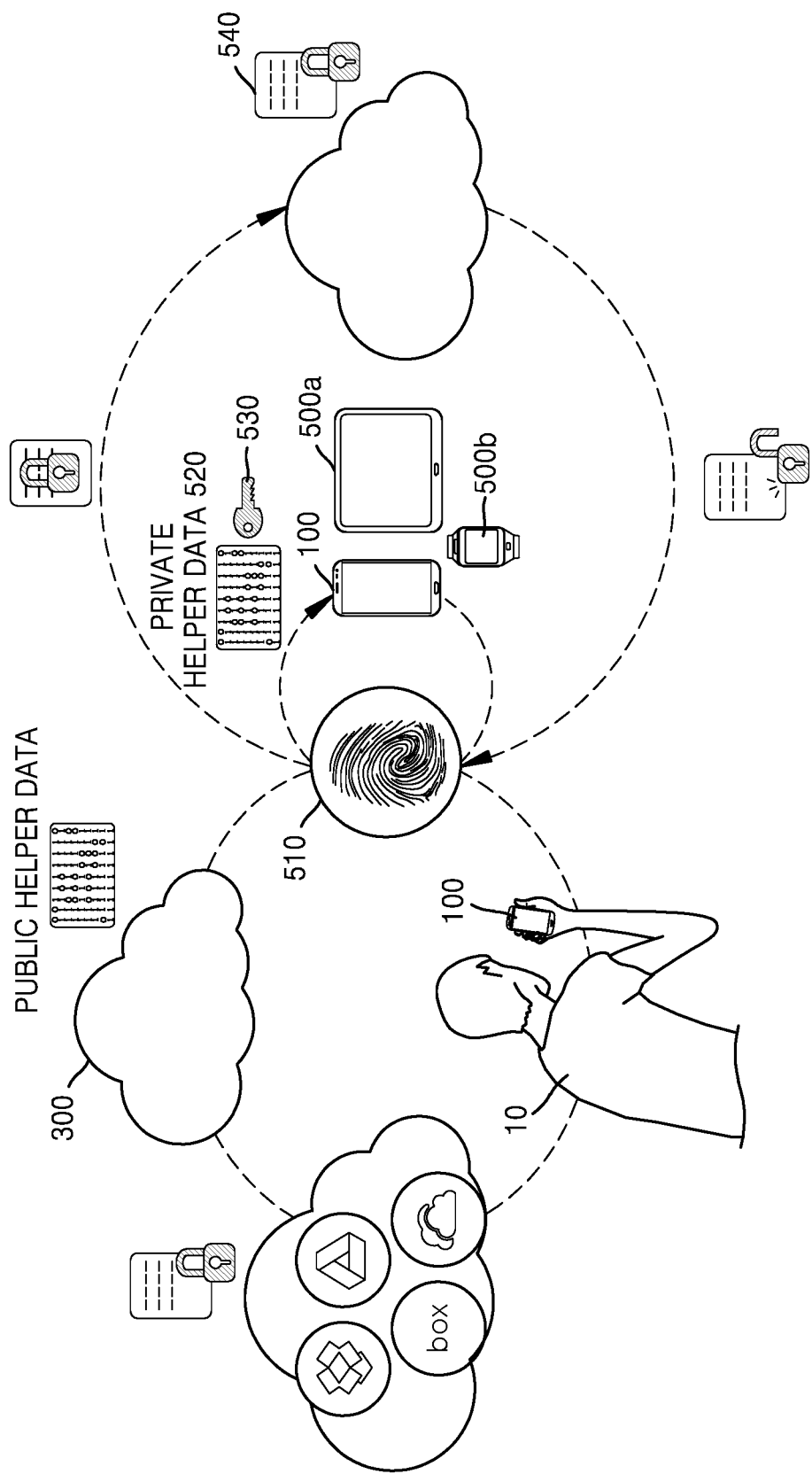
FIG. 5 is a view for explaining a method of performing user authentication by an electronic apparatus using private helper data, according to an embodiment of the disclosure.

FIG. 5 is a view for explaining a method of performing user authentication by the electronic apparatus 100 using private helper data, according to an embodiment of the disclosure.

Referring to FIG. 5, the electronic apparatus 100 may obtain an access request to a document editing application 540 from the user 10. As the access request is obtained, the electronic apparatus 100 may identify helper data required for authentication of the user 10 to allow an access in the document editing application 540. In the embodiment, the helper data may include public helper data and private helper data 520, and the public helper data may be stored externally in the server 300.

When the helper data required for authentication of the user 10 to allow an access in the document editing application 540 is the private helper data 520, the electronic apparatus 100 may extract the private helper data 520 stored in the electronic apparatus 100. The private helper data according to an embodiment may be shared with other electronic apparatuses 500a and 500b synchronized with the electronic apparatus 100.

The electronic apparatus 100 according to an embodiment may generate an encryption key 530 from fingerprint information 510 by using a fuzzy extractor, based on the private helper data 520. For example, the electronic apparatus 100 may identify whether a degree of matching between a hash value corresponding to the fingerprint information 510 and a hash value corresponding to the private helper data 520 is greater than or equal to a first threshold value. When the degree of matching is greater than or equal to the first threshold value, the electronic apparatus 100 may obtain an encryption key by using biometric information, the obtained private helper data, and a Rep function. The encryption key may include a string randomly generated based on a polynomial generated by a gen function.

Meanwhile, according to another embodiment, the electronic apparatus 100 may not generate an encryption key when the degree of matching between a hash value corresponding to the fingerprint information 510 and a hash value corresponding to the private helper data 520 is less than a first threshold value. In this case, the electronic apparatus 100 according to an embodiment may request the user to input fingerprint information again.

Meanwhile, the embodiment of FIG. 5 is an example of a method of performing user authentication using the private helper data, and the electronic apparatus may request user authentication in units of tasks in an application. In this case, when a request to perform a specific task is received, the electronic apparatus may request user's biometric information, and generate an encryption key by using a fuzzy extractor, based on biometric information and private helper data that are received as requested.

Figure 6:
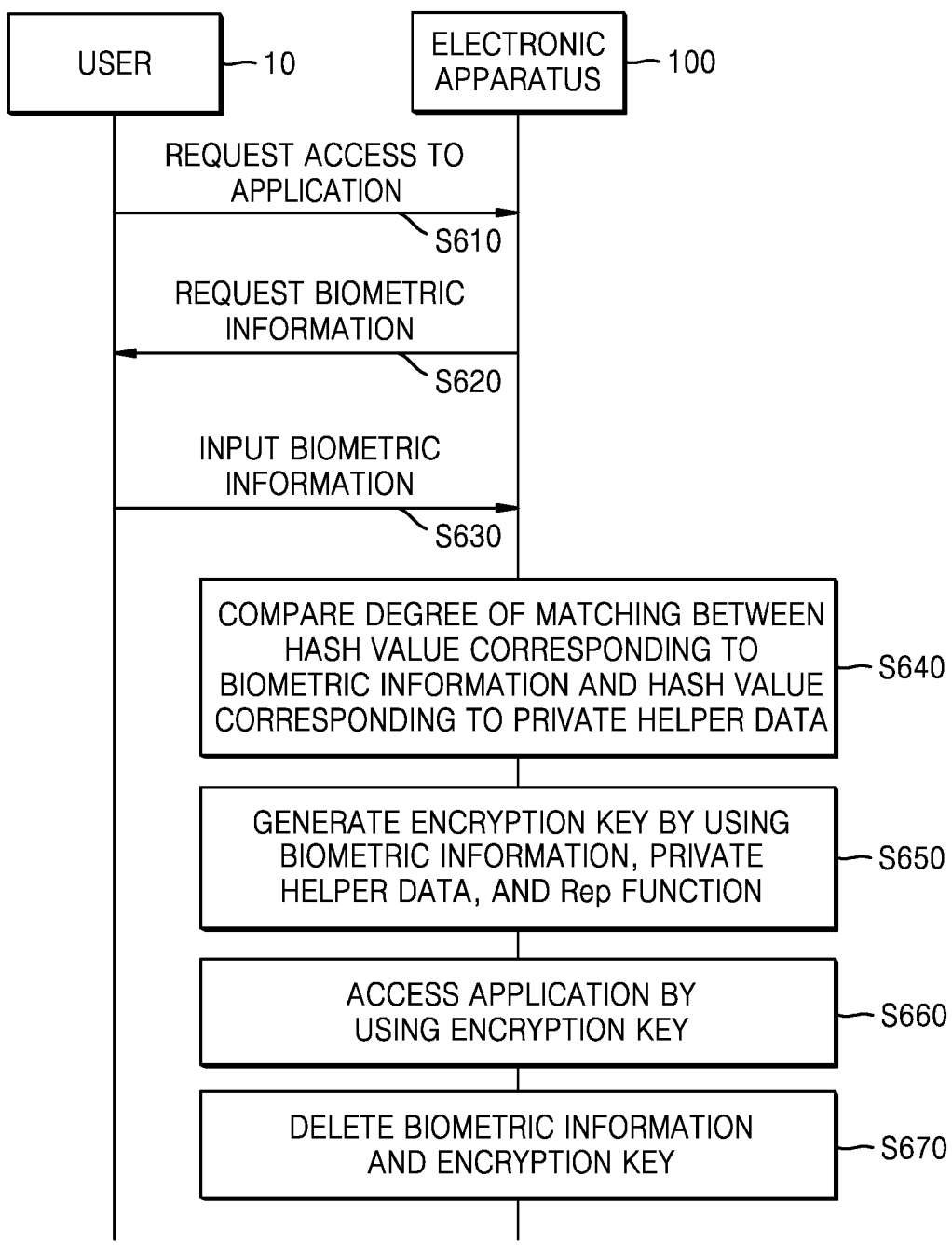
FIG. 6 is a flowchart for explaining a method of performing user authentication by an electronic apparatus using private helper data, according to an embodiment of the disclosure.

FIG. 6 is a flowchart for explaining a method of performing user authentication by an electronic apparatus using private helper data, according to an embodiment of the disclosure.

In operation S610, the user 10 may request the electronic apparatus 100 to access an application.

In operation S620, the electronic apparatus 100 may request biometric information from the user 10. For example, when the user 10 requests an access to a specific application, the electronic apparatus 100 may provide the user 10 with a user interface (UI) for inputting biometric information.

In operation S630, the user 10 may input biometric information to the electronic apparatus 100. For example, the user 10 may input fingerprint information to the electronic apparatus 100, by tapping, with a finger, a particular are of the screen of the electronic apparatus 100.

In operation S640, the electronic apparatus 100 may compare a degree of matching between a hash value corresponding to the biometric information and a hash value corresponding to the private helper data. For example, the electronic apparatus 100 may identify whether a degree of matching between a hash value corresponding to the fingerprint information and a hash value corresponding to the private helper data is greater than or equal to a first threshold value.

In operation S650, the electronic apparatus 100 may generate an encryption key by using the biometric information, the private helper data, and the Rep function. When a degree of matching between a hash value corresponding to the fingerprint information and a hash value corresponding to the private helper data is greater than or equal to the first threshold value, the electronic apparatus 100 may generate an encryption key by using the biometric information, the private helper data, and the Rep function.

In operation S660, the electronic apparatus 100 may access an application by using the encryption key. The electronic apparatus 100 may permit a user's access to the application based on the encryption key.

In operation S670, the electronic apparatus 100 may delete the biometric information and the encryption key. After using the encryption key in an application access authentication process, the electronic apparatus 100 may delete the encryption key and the biometric information used to generate the encryption key. When additional authentication is necessary later, the electronic apparatus 100 may receive new biometric information from the user, and generate an encryption key again by using a fuzzy extractor, based on the biometric information and the private helper data. The electronic apparatus 100 may prevent the problem that the third person may hack the biometric information and the encryption key, by deleting the biometric information and the encryption key without storing.

Figure 7:
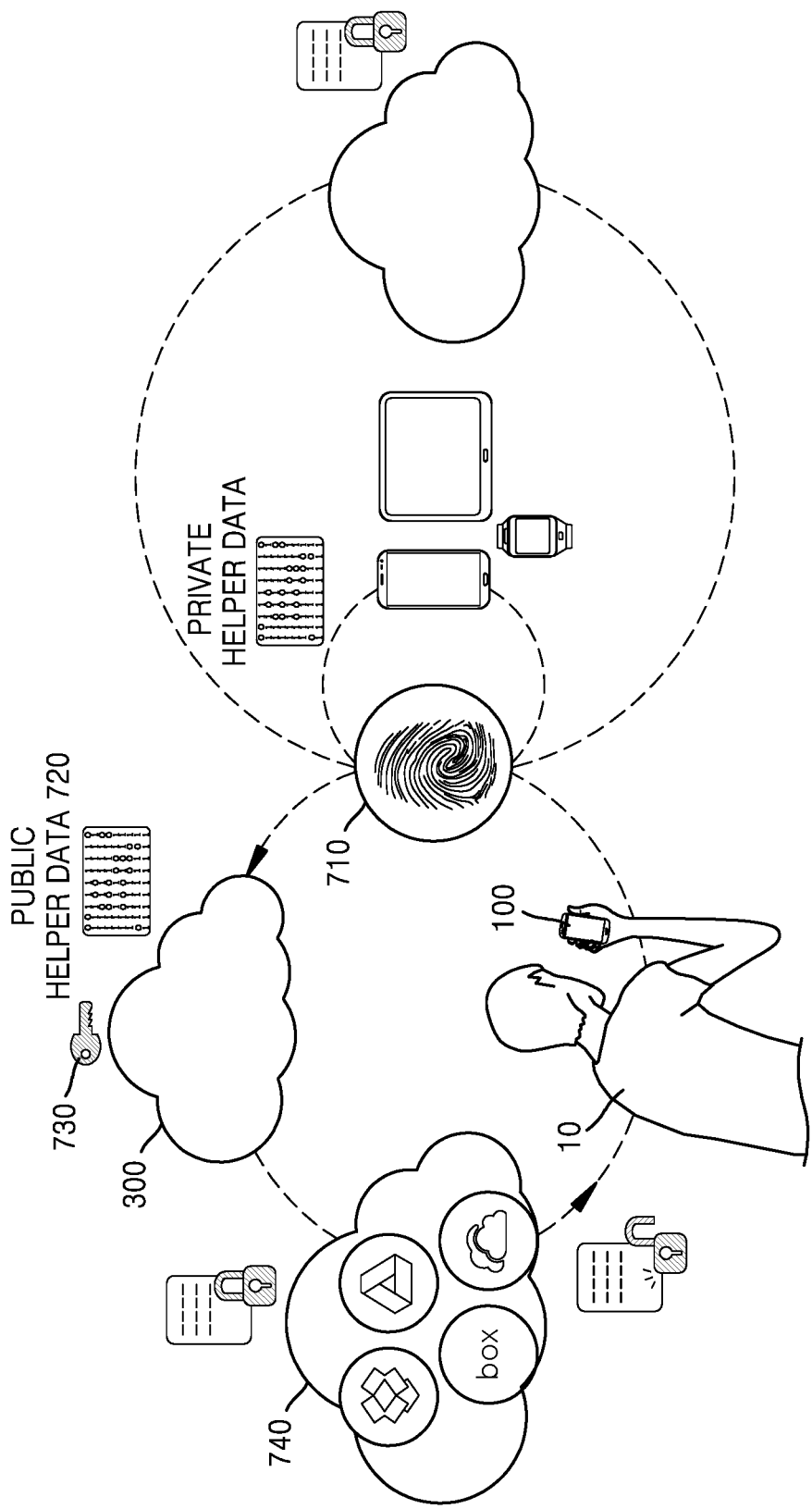
FIG. 7 is a view for explaining a method of performing user authentication by an electronic apparatus using public helper data, according to an embodiment of the disclosure.

FIG. 7 is a view for explaining a method of performing user authentication by the electronic apparatus 100 using public helper data, according to an embodiment of the disclosure.

Referring to FIG. 7, the electronic apparatus 100 may obtain an access request to a mail application from the user 10. As the access request is obtained, the electronic apparatus 100 may identify helper data required for authentication of the user 10 to allow an access in the mail application. In the embodiment, the helper data may include public helper data 720 and private helper data, and the public helper data may be stored externally in the server 300.

The electronic apparatus 100 may identify that the mail application is included in applications 740 in which an encryption key 730 is generated by using the public helper data 720. When helper data required for authentication of the user 10 to allow an access is the public helper data 720, the electronic apparatus 100 may request the public helper data 720 externally from the server 300. The electronic apparatus 100 may receive the public helper data 720 as a response to the request.

The electronic apparatus 100 according to an embodiment may generate the encryption key 730 from fingerprint information 710 by using a fuzzy extractor, based on the public helper data 720. For example, the electronic apparatus 100 may identify whether a degree of matching between a hash value corresponding to the fingerprint information 710 and a hash value corresponding to the private helper data 720 is greater than or equal to a second threshold value. When the matching degree is greater than or equal to the second threshold value, the electronic apparatus 100 may obtain an encryption key by using the biometric information, the obtained private helper data, and Rep function. The encryption key 730 may include a string randomly generated based on a polynomial generated by a gen function. Meanwhile, the second threshold value may be greater than the first threshold value described above with reference to FIG. 5.

Meanwhile, according to another embodiment, when the degree of matching between a hash value corresponding to the fingerprint information 710 and a hash value corresponding to the public helper data 720 is less than the second threshold value, the electronic apparatus 100 may not generate an encryption key. In this case, the electronic apparatus 100 according to an embodiment may request the user to input fingerprint information again.

Meanwhile, the embodiment of FIG. 7 is just an example of a method of performing user authentication using public helper data, the electronic apparatus may request user authentication in units of tasks in an application. In this case, when a request to perform a specific task is received, the electronic apparatus may request user's biometric information, and generate an encryption key by using a fuzzy extractor, based on the biometric information and the public helper data 720 received as requested.

Figure 8:
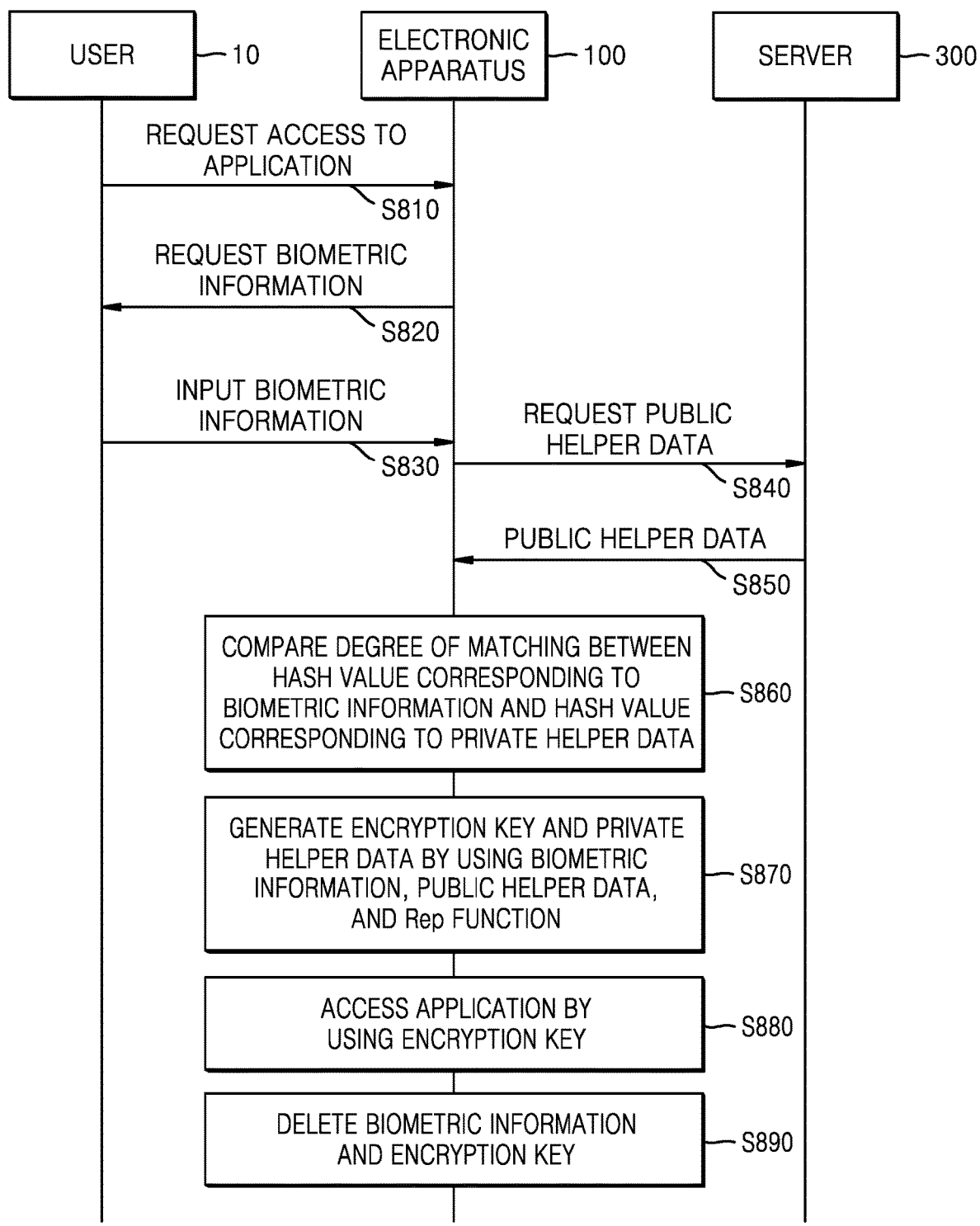
FIG. 8 is a flowchart for explaining a method of performing user authentication by an electronic apparatus using public helper data, according to an embodiment of the disclosure.

FIG. 8 is a flowchart for explaining a method of performing user authentication by an electronic apparatus using public helper data, according to an embodiment of the disclosure.

In operation S810, the user 10 may request an access to an application from the electronic apparatus 100.

In operation S820, the electronic apparatus 100 may request biometric information from the user 10. For example, when the user 10 requests an access to a specific application, the electronic apparatus 100 may provide the user 10 with a UI for inputting biometric information.

In operation S830, the user 10 may input biometric information to the electronic apparatus 100. For example, the user 10 may input fingerprint information to the electronic apparatus 100, by tapping, with a finger, a particular area of the screen of the electronic apparatus 100.

In operation S840, the electronic apparatus 100 may request public helper data from the server 300.

In operation S850, the server 300 may transmit public helper data to the electronic apparatus 100 as requested.

In operation S860, the electronic apparatus 100 may compare a degree of matching between a hash value corresponding to the biometric information and a hash value corresponding to the public helper data. For example, the electronic apparatus 100 may identify whether the degree of matching between a hash value corresponding to the fingerprint information and a hash value corresponding to the public helper data is greater than or equal to the second threshold value.

In operation S870, the electronic apparatus 100 may generate an encryption key by using the biometric information, the public helper data, and a Rep function. When the degree of matching between a hash value corresponding to the fingerprint information and a hash value corresponding to public helper data is greater than or equal to the second threshold value, the electronic apparatus 100 may generate an encryption key by using the biometric information, the public helper data, and a Rep function.

In operation S880, the electronic apparatus 100 may access an application by using the encryption key. The electronic apparatus 100 may allow user's application access, based on the encryption key.

In operation S890, the electronic apparatus 100 may delete the biometric information and the encryption key.

After using the encryption key in the application access authentication process, the electronic apparatus 100 may delete the encryption key and the biometric information used to generate the encryption key. When additional authentication is necessary later, the electronic apparatus 100 may receive new biometric information from the user, and generate an encryption key again by using a fuzzy extractor, based on the biometric information and the public helper data. The electronic apparatus 100 may prevent the problem that the third person may hack the biometric information and the encryption key, by deleting the biometric information and the encryption key without storing.

Figure 9:
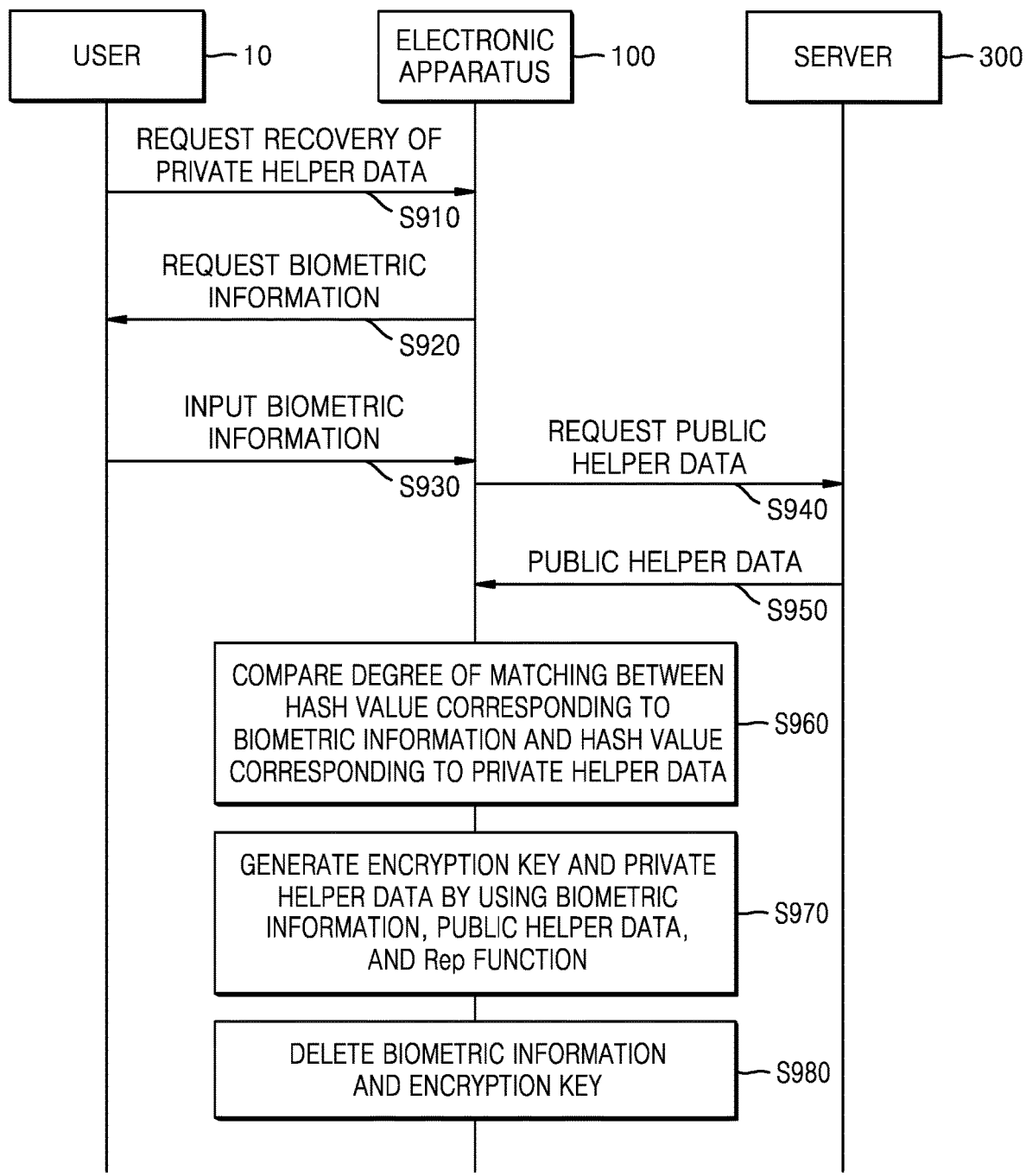
FIG. 9 is a flowchart for explaining a method of recovering private helper data by using public helper data by an electronic apparatus, according to an embodiment of the disclosure.

FIG. 9 is a flowchart for explaining a method of recovering private helper data by using public helper data by an electronic apparatus, according to an embodiment of the disclosure.

In operation S910, the user 10 may request recovery of private helper data from the electronic apparatus 100.

In operation S920, the electronic apparatus 100 may request biometric information from the user 10. For example, when the user 10 requests recovery of private helper data, the electronic apparatus 100 may provide the user 10 with a UI for inputting biometric information.

In operation S930, the user 10 may input biometric information to the electronic apparatus 100. For example, the user 10 may input fingerprint information to the electronic apparatus 100, by tapping, with a finger, a particular area of the screen of the electronic apparatus 100.

In operation S940, the electronic apparatus 100 may request public helper data from the server 300.

In operation S950, the server 300 may transmit public helper data to the electronic apparatus 100 as requested.

In operation S960, the electronic apparatus 100 may compare a degree of matching between a hash value corresponding to the biometric information and a hash value corresponding to the public helper data. For example, the electronic apparatus 100 may identify whether a degree of matching between a hash value corresponding to the fingerprint information and a hash value corresponding to the public helper data is greater than or equal to a third threshold value.

In operation S970, the electronic apparatus 100 may generate an encryption key by using the biometric information, the public helper data, and a Rep function. When the degree of matching between a hash value corresponding to the fingerprint information and a hash value corresponding to the public helper data is greater than or equal to the third threshold value, the electronic apparatus 100 may generate an encryption key and private helper data by using the biometric information, the public helper data, and a Rep function. The electronic apparatus 100 may store generated private helper data.

In operation S980, the electronic apparatus 100 may delete the biometric information and the encryption key, as private helper data is generated.

Figure 10:
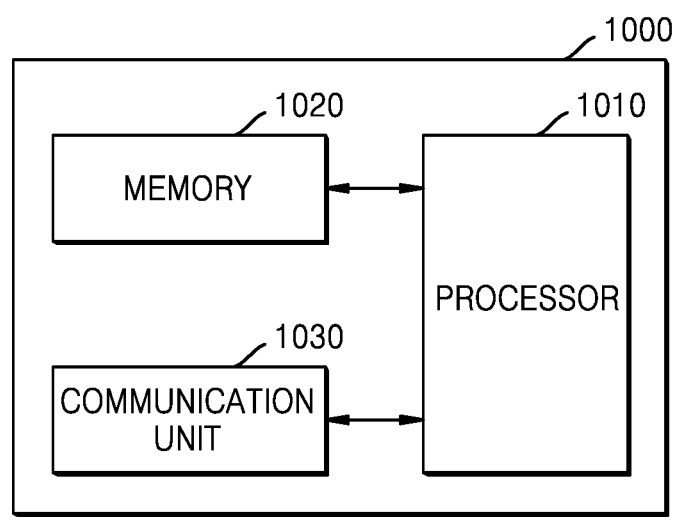
FIGS. 10 and 11 are block diagrams of an electronic apparatus that performs authentication, according to various embodiments of the disclosure.
Figure 11:
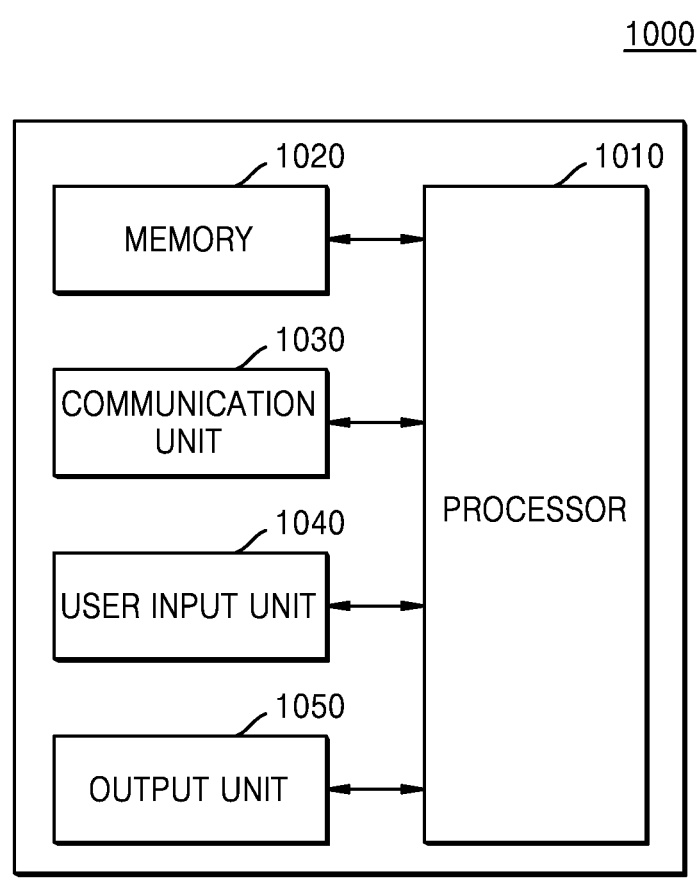

FIGS. 10 and 11 are block diagrams of an electronic apparatus 1000 that performs authentication, according to various embodiments of the disclosure.

Referring to FIG. 10, the electronic apparatus 1000 according to an embodiment of the disclosure may include a processor 1010, a memory 1020, and a communication unit 1030. However, not every illustrated element is an essential element. The electronic apparatus 1000 may be implemented by more elements than the illustrated elements, and by fewer elements than the illustrated elements.

For example, referring to FIG. 11, the electronic apparatus 1000 according to an embodiment of the disclosure may further include a user input unit 1040 and an output unit 1050, in addition to the processor 1010, the memory 1020, and the communication unit 1030.

Meanwhile, the electronic apparatus 1000 of FIGS. 10 and 11 may corresponding to the electronic apparatus described above with reference to of FIGS. 1 to 9.

The elements described above are described below in sequence.

The processor 1010 according to an embodiment may receive an access request to an application executed on the electronic apparatus via the user input unit 1040. The processor 1010 may obtain any one of public helper data and private helper data, which are used for user authentication, based on the access requested application. Furthermore, the processor 1010 may obtain an encryption key from user's biometric information received according to the access request, by using a fuzzy extractor, based on public helper data or private helper data. The processor 1010 may perform user authentication for application access, based on the obtained encryption key.

Meanwhile, when a user is not registered on the electronic apparatus 1000, the processor 1010 according to an embodiment may request user information registration. For example, the processor 1010 may display a UI for inputting user's biometric information through the output unit 1050. The processor 1010 may generate an encryption key corresponding to the biometric information, public helper data, and private helper data, by using a fuzzy extractor, from the biometric information obtained according to the request of the user information registration. In this state, the public helper data may be transmitted to the server, the private helper data may be stored in the electronic apparatus, and the encryption key corresponding to the biometric information may be deleted.

The processor 1010 according to an embodiment may identify an authentication level required in the access requested application. As the identified authentication level is less than a preset value, the processor 1010 may obtain private helper data corresponding to the identified authentication level of at least one piece of private helper data stored in the electronic apparatus. According to another embodiment, when the identified authentication level is greater than or equal to the preset value, the processor 1010 may request public helper data from the server, receive public helper data, and generate an encryption key based on the public helper data.

The processor 1010 another embodiment may receive a request for recovery of private helper data. The processor 1010 may generate an encryption key based on the public helper data received from the server, and recover the private helper data.

The memory 1020 may store the private helper data generated as described above. Furthermore, the memory 1020 may store one or more instructions to control the processor 1010 to perform the operation described above.

The communication unit 1030 may transceive wireless signals with at least one of a base station, an external terminal, and the server in a mobile communication network. The wireless signal may include various types of data according to transceiving of a voice call signal, a video call signal, or a text/multimedia message. For example, the wireless signal may include the public helper data described above with reference to FIGS. 1 to 9.

The user input unit 1040 may mean a device for inputting data for a user to control the electronic apparatus 1000. For example, the electronic apparatus 1000 may obtain biometric information through the user input unit 1040. The user input unit 1040 may include a key pad, a dome switch, a touch pad (a contact capacitance method, a pressure resistance film method, an infrared sensing method, a surface ultrasound conduction method, an integral tension measurement method, a piezo effect method, and the like), a jog wheel, a jog switch, and the like, but the disclosure is not limited thereto.

The output unit 1050 may display information about an application to access. Furthermore, when an access request to a specific application is received, the output unit 1050 may display a UI for inputting biometric information for user authentication. As the user authentication for application access is completed, the output unit 1050 may display an application execution screen.

The apparatus according to the disclosure may include a processor, a memory for storing and executing program data, a permanent storage such as a disk drive, a communication port for communicating with an external device, a user interface device such as a touch panel, a key, a button, and the like, and the like. When methods are implemented by software modules or algorithms, these software modules may be stored as program instructions or computer-readable codes executable on a processor on a computer-readable recording medium. Examples of the computer-readable recording medium include magnetic storage media (e.g., read-only memory (ROM), random access memory (RAM), floppy disks, hard disks, etc.), and optical recording media (e.g., compact disc read only memories (CD-ROMs), digital versatile discs (DVDs), etc.). The computer-readable recording medium can also be distributed over network coupled computer systems so that the computer-readable code is stored and executed in a distributive manner. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The disclosure may be described in terms of functional block components and various processing steps. Such functional blocks may be realized by any number of hardware and/or software components configured to perform the specified functions. For example, the disclosure may employ various integrated circuit (IC) components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors.

Furthermore, the disclosure could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems may be omitted. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing authentication by an electronic apparatus, the method comprising:
   receiving an access request to an application executed on the electronic apparatus and biometric information of a user of the electronic apparatus;
   identifying an authentication level required in the application;
   based on a result of comparing the authentication level with a preset value, obtaining either public helper data stored in a server or private helper data stored in the electronic apparatus as helper data used for user authentication;
   obtaining an encryption key based on the biometric information of the user and either the public helper data or the private helper data by using a fuzzy extractor; and
   performing user authentication for accessing the application, based on the encryption key,
   wherein the public helper data is used to generate the encryption key for access to an application that requires security greater than or equal to a reference value, and the private helper data is used to generate the encryption key for access to an application that requires security lower than the reference value.

2. The method of claim 1, further comprising:
   requesting user information registration via a user information registration request; and
   generating the encryption key corresponding to the biometric information of the user, the public helper data, and the private helper data, by using the fuzzy extractor, from the biometric information of the user obtained according to the user information registration request,
   wherein the public helper data is transmitted to a server, the private helper data is stored in the electronic apparatus, and the encryption key corresponding to the biometric information of the user is deleted.

3. The method of claim 1, wherein the obtaining of the private helper data comprises:
   based on the authentication level being less than the preset value, obtaining private helper data corresponding to the authentication level from at least one piece of the private helper data stored in the electronic apparatus.

4. The method of claim 3, wherein the obtaining of the encryption key comprises:
   identifying whether a degree of matching between a hash value corresponding to the biometric information of the user and a hash value corresponding to the private helper data is greater than or equal to a first threshold value; and
   obtaining the encryption key by using the biometric information of the user, the private helper data, and a Rep function, based on whether the degree of matching is greater than or equal to the first threshold value.

5. The method of claim 3, wherein the obtaining of the private helper data comprises:
   based on the authentication level being greater than or equal to the preset value, requesting public helper data from a server; and
   receiving the public helper data from the server, based on the requesting.

6. The method of claim 5, wherein the obtaining of the encryption key comprises:
   identifying whether a degree of matching between a hash value corresponding to the biometric information of the user and a hash value corresponding to the public helper data is greater than or equal to a second threshold value; and
   obtaining the encryption key by using the biometric information of the user, the public helper data, and a Rep function, based on whether the degree of matching is greater than or equal to the second threshold value.

7. The method of claim 1, further comprising:
   receiving a recovery request of the private helper data;
   receiving second biometric information;
   identifying whether a degree of matching between a hash value corresponding to the second biometric information and a hash value corresponding to the public helper data is greater than or equal to a third threshold value, based on the public helper data received from a server; and
   generating the encryption key and the private helper data by using the second biometric information, the public helper data, and a Rep function, based on whether the degree of matching is greater than or equal to the third threshold value.

8. An electronic apparatus for performing authentication, the electronic apparatus comprising:
   a communication unit;
   memory storing one or more instructions; and
   at least one processor configured to execute the one or more instructions stored in the memory,
   wherein the at least one processor is further configured to:
      receive an access request to an application executed on the electronic apparatus and biometric information of a user of the electronic apparatus,
      identify an authentication level required in the application,
      based on a result of comparing the authentication level with a preset value, obtain either public helper data stored in a server or private helper data stored in the electronic apparatus as helper data used for user authentication, obtain an encryption key based on the biometric information of the user and either the public helper data or the private helper data by using a fuzzy extractor, and perform user authentication for accessing the application, based on the encryption key, and wherein the public helper data is used to generate the encryption key for access to an application that requires security greater than or equal to a reference value, and the private helper data is used to generate the encryption key for access to an application that requires security lower than the reference value.

9. The electronic apparatus of claim 8, wherein the at least one processor is further configured to:
request user information registration via a user information registration request; and
generate the encryption key corresponding to the biometric information of the user, the public helper data, and the private helper data, by using the fuzzy extractor, from biometric information of the user obtained according to the user information registration request, and wherein the public helper data is transmitted to a server, the private helper data is stored in the electronic apparatus, and the encryption key corresponding to the biometric information of the user is deleted.

10. The electronic apparatus of claim 8, wherein the at least one processor is further configured to:
based on the authentication level being less than the preset value, obtain private helper data corresponding to the authentication level, from at least one piece of the private helper data stored in the electronic apparatus.

11. The electronic apparatus of claim 10, wherein the at least one processor is further configured to:
identify whether a degree of matching between a hash value corresponding to the biometric information of the user and a hash value corresponding to the private helper data is greater than or equal to a first threshold value; and
obtain the encryption key by using the biometric information of the user, the private helper data, and a Rep function, based on whether the degree of matching is greater than or equal to the first threshold value.

12. The electronic apparatus of claim 10, wherein the at least one processor is further configured to:
when the authentication level is greater than or equal to the preset value, control the communication unit to request public helper data from a server; and
control the communication unit to receive the public helper data from the server, based on the requesting.

13. The electronic apparatus of claim 12, wherein the at least one processor is further configured to:
identify whether a degree of matching between a hash value corresponding to the biometric information of the user and a hash value corresponding to the public helper data is greater than or equal to a second threshold value; and
obtain the encryption key by using the biometric information of the user, the public helper data, and a Rep function, based on whether the degree of matching is greater than or equal to the second threshold value.

14. The electronic apparatus of claim 8, wherein the at least one processor is further configured to:
receive a recovery request of the private helper data;
receive second biometric information;
identify whether a degree of matching between a hash value corresponding to the second biometric information and a hash value corresponding to the public helper data is greater than or equal to a third threshold value, based on the public helper data received from a server; and
generate the encryption key and the private helper data by using the second biometric information, the public helper data, and a Rep function, based on whether the degree of matching is greater than or equal to the third threshold value.

15. A non-transitory computer-readable recording medium having stored therein one or more instructions, which causes an electronic apparatus to:
receive an access request to an application executed on the electronic apparatus and biometric information of a user of the electronic apparatus;
identify an authentication level required in the application;
based on a result of comparing the authentication level with a preset value, obtain either public helper data stored in a server or private helper data stored in the electronic apparatus as helper data used for user authentication;
obtain an encryption key based on the biometric information of the user and either the public helper data or the private helper data by using a fuzzy extractor; and
perform user authentication for accessing the application, based on the encryption key,
wherein the public helper data is used to generate the encryption key for access to an application that requires security greater than or equal to a reference value, and the private helper data is used to generate the encryption key for access to an application that requires security lower than the reference value.

* * * * *